United States Patent Office 3,151,020
Patented Sept. 29, 1964

3,151,020
SLIME-CONTROLLED INDUSTRIAL PROCESS
WATER SYSTEM AND PROCESS
George A. Cruickshank, deceased, late of La Grange, Ill., by Agnes M. Cruickshank, administratrix, La Grange, Ill., assignor to Nalco Chemical Company, Chicago, Ill., a corporation of Delaware
No Drawing. Filed May 10, 1961, Ser. No. 109,228
9 Claims. (Cl. 162—190)

This invention relates to the control of microorganisms in aqueous fluid media through the use of novel microbiocides. More particularly, the present invention is concerned with a method of inhibition and control of microorganisms in industrial process water systems through the use of polyhalogenated ester compositions.

The inhibition and control of the growth and reproduction of microorganisms in aqueous recirculating waters in industrial processes has long been recognized as a particularly burdensome problem. The environment of the aqueous medium itself is often extremely conducive to rapid multiplication and growth of these undesirable microorganisms. Only through the use of carefully tailored microbiocidal compositions can the growth and reproduction of these undesirable organisms be reliably controlled without detriment to the process in which the water is used. Without effective control, loss of product, inferior product, production-time loss, and other types of expensive problems may occur in the system.

The particular problems inherent in the microbiological control of an aqueous fluid medium are vastly different than those involving control of other harmful organisms in environmental conditions other than that of water. For example, many times a chemical is rendered completely inactive by the particular surrounding media containing the undesirable microorganisms. Compounds such as ethylene oxide and beta-lactone which are well known fungicides, are completely or nearly completely inactive in aqueous media with regard to inhibition of growth and reproduction of the microorganisms contained therein.

General considerations of antimicrobic agents and processes reveal that efficient control of each specific type of microorganism growth, requires a specific chemical-physical type of treatment. The choice of the active chemical and/or the method of application depends upon the system to be controlled. Different biocidal processes and antibiotic chemicals cannot legitimately be equated in a general manner.

Many broad classes of biocidal agents are known to the art. It is also known that antiseptics, disinfectants, fumigants, fungistats, fungicides, preservatives, chemical and physical sterilants, and pasteurization agents must all be particularly designed to obviate the specific problem at hand. The inherent chemical make-up of each class of composition intrinsically depends upon the organisms to be controlled and medium in which they are contained. Physical form, in addition to chemical configuration, may also be important. For example, in the control of insects the particular chemical normally must be low boiling and capable of volatilization in order to contact the undesirable pest. In like manner a fumigant must have a high degree of toxicity to insects in all stages of life cycle.

One problem in the broad spectrum of microbiological control is that of industrial process water systems. This is the problem solved by the invention here. In order to economically utilize the aqueous industrial process media it is often necessary to recirculate it many times. This recirculaion causes many difficult problems, among which is the gradual build-up and accumulation of undesirable microorganisms in the aqueous fluid. Various species of bacteria and fungi are favorably produced in such an environment of recirculating use.

One of the most acute industrial biological control problems is that in papermill water systems which contain aqueous dispersions of paper-making fibers. The uncontrolled build-up of microbiological slime due to the accumulation of microorganisms, causes off-grade production, increased maintenance costs, decreased production because of breaks and the requirement of more frequent wash-ups and excessive raw material usage. For example, slime deposits result in contamination of the stock by deposition thereon with consequent breaks in the subsequent formed sheets. It has been discovered that chemical control of these microorganisms will obviate the problems recited above. Application of selected slimicides to strategic locations throughout the paper-making process achieves good control and does away with potentially troublesome conditions.

In the papermill industry itself the widespread adoption of closed white water systems creates especially severe operating conditions since this system lends itself even more to accumulation of slime deposits by virtue of the continuous recycling of the white water. In order to overcome the problems created by the presence of slime in these closed white water systems, paper manufacturers have for along time been seeking slime control agents which not only keep the slime in abeyance by inhibiting the growth of slime but also effect a kill and inhibit initial slime formation by impairment of a vital function of slime-forming organisms, namely, reproduction.

A typical closed white water papermaking process may generally be thought to include the following steps:

(1) Stock preparation;
(2) Formation of a wet web by filtration and vacuum; and,
(3) Removal of the water from the form sheet by pressing and heat.

The various pulps such as unbleached groundwood, unbleached sulphite, bleached sulphite, bleached sulfate or unbleached sulfate, prepared by well-known processes, are then subjected to the desired mechanical treatment, generally known as stock preparation. This step includes processing such as slushing, beating and refining. Slushing or dispersing the fibers in water may be done in such machines as a Hydrapulper. The stock suspension is later subjected to beating and refining, that is, cutting processes to increase fiber surface, flexibility and decrease fiber lengths. A typical refining operation is carried out in a Jordan conical refiner.

The second general process step of arrangement of the fibers in suspension into a wet web is normally effected by a Fourdrinier or cylinder machine. In general a Fourdrinier machine is preferred and will be described below. This step consists of running the dilute suspension of fibers evenly onto a surface of a continuous belt of wire cloth. The water of the web is removed by gravity, suction, and pressure. However, before the stock suspension is formed on the wire cloth it is placed in a machine chest to provide the necessary reserve needed for machine operation and regulate the flow. The suspension of fibrous material is transported from the machine chest to the headbox, the latter converting the flow into a flat stream and then to a slice wire which controls the stream and therefore the sheet thickness.

The water leaving the wire of the Fourdrinier machine is commonly known as white water and is caught on trays underneath the machine. In order to recover fibers and other solids from this white water it is necessary to employ a so-called Saveall type of recovery. This may include such processes as filtration, flotation, and sedimentation. An example of a flotation process involves the use of a Sveen Saveall. Here white water is discharged in the presence of a special glue whereby the fibers are coagulated and subsequently skimmed off the surface of the water.

The extreme complexity of the above system coupled with the favorable growth conditions for microorganisms through the use of recirculating water causes slime masses to thrive and form throughout the various individual parts of the system. Particularly troublesome areas are corners of equipment, areas of poor stock flow, and high density storage sites. These slime masses prevent normal flow of stock suspension, make the stock lumpy, and prevent normal sheet formation.

Generally papermill systems contain from 0.1% to 15% by weight of cellulosic fiber material in the form of an aqueous pulp. Such an aqueous pulp medium is potentially conducive to the growth of such bacteria as *Pseudomonas aeruginosa, Aerobacter cloacae, Streptococcus faecalis, Bacillus pumilus, Micrococcus pyogenes, Bacillus subtilis, Aerobacter aerogenes, Bacillus mycoides, Desulfovibrio desulfuricans*, and fungi such as *Penicillium glaucum*, Cephalosporium, *Aspergillus terreus*, Trichoderma and *Aspergillus niger*.

Another use of water in industry is that of an efficient cooling medium for industrial cooling towers, air conditioning equipment, internal combustion engines and the like.

Since heat may be easily and economically removed by water in such systems as evaporative cooling towers, these systems have been widely adopted in many industries. Again the water used in such systems is recirculated, thus complicating the problem of microbiological control. The microorganisms that accumulate in the towers impair their efficiency with respect to heat exchange. Slime build-ups result in large adherent masses which plug equipment and restrict flow. These same microorganisms cause deterioration of cooling tower lumber by selective removal of cellulose from the surface. It has been found that even small amounts of nutrients found in cooling tower systems support these microorganisms in their reproduction and defeat control efforts. Solution of this specialized and difficult industrial problem not only requires use of chemicals effective to control of microorganisms, but in addition these same chemicals must possess a sufficiently high vapor pressure so as not to be carried off and create a potential hazard to those working in the area.

One approach to the problem of control of microorganisms in industrial process waters has been effected through the use of a combination of chemical treating agents. It would be an advantage to the industry to discover a class of chemical useful as a single reagent for inhibiting and control of undesirable microorganisms in aqueous media, without subsequent addition of other treating agents. Another advantage to the industry would be the creation of chemicals which, while effective as biocides and biostats in aqueous media, nevertheless are relatively non-volatile, non-toxic to humans, easily handled, and may be injected into the system to be treated with a minimum of effort and special equipment.

It would also be desirable if a microbiocidal agent could be found to adequately control microorganisms of the type occurring not only in the aqueous systems described above but also in other aqueous media such as oil-field waterfloor treatments and the like.

Not only is it extremely desirable that chemicals be found which are able to control a number of harmful species of microorganisms in the particular aqueous industrial system, but it is also desired that these same treating agents have activity over a wide pH range. It is further desired that these same chemicals not be readily affected by the particular medium in which the microorganisms are contained, but rather possess the ability to kill, inhibit, and control microorganisms before being chemically or physically modified. It would be a valuable contribution if a class of microbiocides could be synthesized for effective efficient biocidal use in aqueous environments.

It, therefore, becomes an object of this invention to provide a new class of microbiocidal agents stable in aqueous media which are effective in controlling the microorganisms contained in industrial process water systems.

Another object of the invention is to provide an effective method of inhibition and control of growth and reproduction of undesirable microorganisms contained in aqueous fluid media.

Still another object is to synthesize a multi-purpose class of chemicals which will inhibit and control microorganisms without resort to combinations with other treating agents.

Another object is to provide and furnish new chemicals which may be used to effectively treat fluid aqueous systems at low, easily added economical dosages.

A specific object is the control of papermill slime deposits through the use of novel microbiocidal chemicals, and particularly to provide chemicals useful in such specific papermill systems as a closed white water system.

Still another specific object is the protection of cooling tower systems from build-up of microorganisms which may undesirably produce loss of heat exchange capacity, by use of an effectively active group of compositions which do not tend to escape from the treated system.

Yet another object is the synthesis of chemicals which may be easily applied to an aqueous system to be controlled with relatively little toxicity hazard to the operator of such system.

Other objects will appear hereinafter.

In accordance with the invention it has been discovered that the control and inhibition of the growth and reproduction of microorganisms in industrial process waters may be effected by the incorporation therein of an organic polyhalogenated ester corresponding to the type of formula:

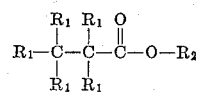

wherein $R_1$ is selected from the group consisting of lower alkyl (e.g., methyl, ethyl, propyl, isopropyl, butyl, isobutyl, secondary butyl, tertiary butyl, amyl, isoamyl, and hexyl), halogen (e.g., chlorine, bromine and iodine), and hydrogen, and $R_2$ is a hydrocarbon radical containing from 1 to 6 carbons (e.g., methyl, ethyl, propyl, isopropyl, butyl, isobutyl, secondary butyl, tertiary butyl, amyl, isoamyl, hexyl and cyclohexyl). It is necessary that at least two occurrences of $R_1$ be halogen. Preferably, the organic polyhalogenated ester is an alkyl polyhalogenated ester.

By the term "lower alkyl" is meant a hydrocarbon containing from 1 to 6 carbon atoms and preferably from 1 to 3 carbon atoms. The most preferred alkyl group is methyl. The carbon atoms need not necessarily be arranged in a straight chain configuration but may also have branched hydrocarbon radicals proceeding from the main chain.

By treating industrial process waters with the above esters, the invention is directed to providing a microbiologically controlled industrial process water which comprises a major portion of an aqueous liquid and a minor portion of at least a microbiocidally active amount of an organic polyhalogenated ester corresponding to the type formula above.

While any polyhalogenated alkyl substituent of the ester may be usefully employed in the invention, the more preferred materials are those which contain bromine as the halogen constituent. The most preferred polybromo esters are those in which two occurrences of R are bromine. These include compounds such as methyl 2,3-dibromopropionate and methyl 2,3-dibromo-2-methyl propionate. Of these, the most desirable compound is methyl 2,3-dibromopropionate from the standpoint of low cost, manufacturing ease and excellent handling properties. While the polybromo esters are preferred, other compounds such as methyl 2,3-dichloropropionate and methyl 2,3-dichloro-2 propionate are also extremely valuable treating agents of the industrial process aqueous systems.

The method of inhibition of growth and reproduction of microbiological organisms in industrial process water systems broadly comprises the steps of treating such systems by adding to them at least a microbiocidal amount of a composition which comprises an organic polyhalogenated ester corresponding to the above recited type formula. The amount of polyhalogenated ester necessary to achieve control of the microorganisms will, of course, vary depending upon the particular system treated, as well as the types of species found present. In most cases, however, as little as .5 p.p.m. to 25 p.p.m. will give adequate control, although quantities ranging as high as 500 p.p.m. may be necessary in some cases. Small quantities of the chemical are extremely effective in industrial process systems where the water is recirculated and re-used, which means that the quantity of the chemical will gradually build-up to a maximum usable and effective treating dosage, which may be calculated knowing the specific factors in each particular system.

The invention is particularly useful when the said chemical treating agents are added to paper-making process water systems and industrial cooling water systems. A water system which can be treated with particular success by the above process is a closed white water system. However, slime-producing organisms in any paper-making process water system may be generally inhibited by the use of the compositions of the invention.

It has been determined that when the chemicals of the invention are used in papermill systems and particularly in closed white water papermill systems the amount of chemical used in effectively controlling the microorganisms contained therein, may vary from .01 to 10 pounds per ton of paper pulp. More preferably the chemical is added in amounts from 0.1 to 5 pounds per ton of pulp.

A number of the polyhalogenated esters used in the invention are not particularly dispersible or soluble in aqueous media, and therefore it is expedient and a preferred practice of the invention to disperse or solubilize them in various solvents. In addition, these same formulations may contain other components such as emulsifiers. Useful emulsifiers include sulfonated non-ionics, polyoxyalkylene ethers and their derivatives, and sulfonated oils. Blends of the above in any proportion may also be employed. $C_6$–$C_{22}$ alkenyl succinic anhydrides or their alkali metal salts or such materials as ethoxylated and/or propoxylated fatty-substituted amines which contain from 3 to 15 mols of ethylene oxide are also useful emulsifiers.

A wide variety of organic solvents may be employed. Selection may be made from among alcohols, aliphatic hydrocarbons, aroxyl compounds, alkoxyl compounds, and alkaryl solvents. Desirable solvents are those containing aromatic groups such as petroleum aromatic solvents, xylene, toluene, or benzene. The most preferable solvents for the active ingredients, the polyhalogenated esters, are aliphatic hydrocarbons containing at least 5 carbon atoms and preferably from 6 to 12 carbon atoms.

A preferred general liquid formulation containing an aliphatic hydrocarbon solvent with excellent stability and handling properties is listed in Table I below:

TABLE I

| Ingredient: | Percent range by weight |
|---|---|
| (1) Polyhalogenated alkyl ester | 10–50 |
| (2) Aliphatic hydrocarbon solvent | 89.9–42 |
| (3) Emulsifier | 0.1–8 |

A typical formulation of the general type outlined in Table I contains 30% of methyl, 2,3-dibromopropionate, 66% of a mixture of aliphatic hydrocarbons containing from eight to eleven carbons, and 4% Emcol H–300–X emulsifier, a blend of polyoxyethylene ethers and oil sulfonates produced by Emulsol Chemical Corporation.

Table II below lists the physical properties of a typical aliphatic hydrocarbon listed under the trade name of Bronoco #365 Solvent.

TABLE II

Physical characteristics:

| | |
|---|---|
| Gravity A.P.I. at 60° F. | 48–50°. |
| Gallon weight, pounds | 6.49–6.56#. |
| Color | Water white. |
| Doctor | Sweet. |
| Corrosion | Negative. |
| Flash point, tag closed cup | 100° F. min. |
| K butanol value | 34 cc. min. |
| Distillation, ° F.: | |
| I.B.P. | 310–320. |
| 50 | 320–330. |
| 95 | 350–360. |
| Dry end point A.S.T.M. e.p. | 360–375. |
| Recovery | 98%. |
| Cloud point | Clear at −36° F. |
| Pour point | Fluid at −36° F. |
| Viscosity at 60° F. | 2.6 cps. |
| P.M.C.C. | 89° F. |
| C.O.C. | 126° F. |
| Fire point | 126° F. |

Table III shows the useful ranges of another typical formulation involving an active microbiocide solubilized by heavy petroleum aromatic oil and maintained by an emulsifier.

TABLE III

| Ingredient: | Percent range by weight |
|---|---|
| (1) Polyhalogenated alkyl ester | 10–50 |
| (2) Heavy aromatic petroleum type oily | 89.9–42 |
| (3) Emulsifier | 0.1–8 |

A preferred formulation contains 30% by weight of methyl, 2,3-dibromopropionate, 68% heavy aromatic oil and 2% of an emulsifier, Toximul 500 a sulfated nonionic blend produced by Stepan Chemical Company. These three components are easily and safely mixed in any sequence and the resulting product is a clear amber liquid which may be easily applied to the system to be treated. The physical properties of this formulation are listed in Table IV below:

TABLE IV

Physical properties:

| | |
|---|---|
| Specific gravity | 1.102–1.111. |
| Flash point, C.O.C. | Greater than 120° F. |
| Color | Clear amber. |
| Odor | Aromatic. |
| pH, 1% in deionized water | 4.5. |
| Solubility | Dispersible in water. |
| Free stability | No crystals at 10° F. |
| Solvent type | Non-aqueous. |
| Temperature stability | Stable at 130° F. for 6 months. |
| Drum corrosivity | Shipment in double-lined drums. |

The materials of the invention are quite frequently soluble at use concentrations in industrial process water systems so that chemical briquette absorbents such as soda ash, dextrine and the like may be used to prepare solid materials for feeding with conventional briquette feeding equipment.

Any well-known method of addition of halogen to the appropriate starting materials may be employed to obtain the polyhalogenated organic esters. However, a particularly useful method involves the addition of halogen across a single or multi double-bonded starting material to obtain the dihalogenated or higher halogenated products depending upon the number of double bonds in the starting material. Generally it is necessary in this reaction to hold the temperature between 30 and 70° C. by the use of a cooling bath because of the rapidity of the reaction and its exothermic character.

One such specific method of the above general type reaction may involve the addition of liquid bromine to methyl acrylate at temperatures from 40 to 80° C. during the course of 3-8 hours. After the addition of bromine it may be desirable to distill out the unreacted liquid methylacrylate. The methyl 2,3-dibromopropionate may be later solutized as recited above. An example of a typical microbiocidal composition, methyl 2,3-dibromopropionate, is described in Example I below.

Example I.—Preparation of Methyl 2,3-Dibromopropionate 900 grams of methyl acrylate are added to a 3 liter, 3-neck round-bottom flask equipped with a thermometer, mechanical stirrer, and ice-cooling bath. 1645 grams of bromine were added to the methyl acrylate through the use of a separatory funnel. During the course of the reaction the mixture was stirred rapidly. At the beginning rapid addition of bromine was allowed (about 5 mil.) until the temperature within the flask rose to 60° C. This occurred after a period of one minute. The temperature was maintained between 50 and 60° C. by continuous drop-wise addition of bromine until all the bromine was added. During the course of the reaction the bromine color disappeared rapidly upon its addition. However, after addition of approximately 80% of the bromine the brownish-red color of bromine persisted inside the flask. The total reaction time required was approximately 30 minutes. The resulting solution was then refluxed through the use of a heating mantle for a period of six hours. During this time some decoloration of the solution was apparent. The reflux temperature was maintained between 70 and 85° C.

EVALUATION OF THE INVENTION

In order to determine the efficacy of the invention for treating various types of industrial process waters under a wide variety of conditions, two test methods were used. These test methods correlate with the conditions existing in many industrial process systems where microbiological problems occur. These test methods are set forth in detail below:

TEST METHOD.—GAS TUBE AND GROWTH INHIBITION

In this test the culture medium used consisted of 24 grams of dextrose, 1 gram of Basaminbact (Anheuser Busch), added to one liter of Chicago tap water and sterilized by auto-claving under 15 pounds of pressure for 15 minutes. The final pH of the autoclaved medium was 6.8±0.1. An appropriate amount of 18 to 24 hour nutrient broth culture of $A.$ $aerogenes$ or spore suspension of $A.$ $niger$ was mixed with 200 ml. of the culture medium immediately before starting tests, to give an inoculated culture medium having one million organisms per ml. of medium. This inoculated culture medium was placed in each of a series of fermentation tubes with caps which contained the appropriate concentration of test chemical to give a final volume of test chemical and culture medium of 20 ml. in each tube. For this purpose the maximum volume of chemical introduced should be 0.5 ml. per tube to avoid chemical-solvent interference. Many solvent carriers of active materials are themselves somewhat effective, and efficient comparative testing requires that only small amounts of these solvents be introduced into the culture medium. The chemical and the inoculated medium were mixed gently. Two control tests were also run, one in which the chemical was omitted, and the second in the absence of inoculum. In mixing, tubes were inverted in the $A.$ $aerogenes$ gas inhibition study so as to fill the gas detection vials. The $A.$ $niger$ fungal growth inhibition study tubes were shaken. Inhibition ranges for $A.$ $aerogenes$ were determined by noting the presence or absence of gas production in the gas vials after 48 hours' incubation at 90° F. The $A.$ $niger$ test tubes were incubated for 5 days at 30° C. and inhibition levels were determined by noting presence or absence of growth in the tubes at the end of this period of time.

Using the above described chemical synthesis and test method of inhibition several typical compositions of the invention were prepared and their activity determined. The activity of compositions of the invention was directly compared with that of other haloalkyl esters. Results are reported as parts of chemical treating agent necessary to effectively inhibit one million microorganisms. These results are set forth in Table V.

TABLE V.—MICROBIOLOGICAL ACTIVITY OF HALOGENATED ESTERS—INHIBITION RESULTS

| Composition | Name and Structure | Inhibition Results (p.p.m.) [1] | |
|---|---|---|---|
| | | $Aa^+$ 48 hr. Inhibition | $An^{++}$ 5 day Inhibition |
| I | N-lauryl bromoacetate<br>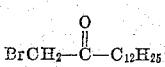 | 500–1,000 | 200–500 |
| II | 1,3-dibromo isopropylacetate<br>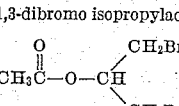 | 100–200 | 100–200 |
| III | Methyl 2,3-dichloropropionate<br>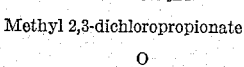 | 10–25 | 5–10 |
| IV | 1,3-dichloroisopropylacetate<br>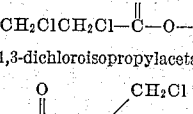 | 200–500 | 200–500 |

See footnotes at end of table.

TABLE V—Continued

| Composition | Name and Structure | Inhibition Results (p.p.m.) [1] | |
|---|---|---|---|
| | | Aa+ 48 hr. Inhibition | An++ 5 day Inhibition |
| V | Methyl trichloroacetate<br>$Cl_3C-\overset{O}{\underset{\|}{C}}-OCH_3$ | 200-500 | 500-1,000 |
| VI | Methyl dichloroacetate<br>$Cl_2CH\overset{O}{\underset{\|}{C}}-O-CH_3$ | 200-500 | 200-500 |
| VII | Methyl 2,3-dibromopropionate<br>$BrCH_2CHBr\overset{O}{\underset{\|}{C}}-O-CH_3$ | 2.5-5 | 1-2.5 |
| VIII | Ethyl 2,3-dibromopropionate<br>$BrCH_2CHBr\overset{O}{\underset{\|}{C}}-O-CH_2CH_3$ | 10-25 | 1-2.5 |
| IX | Ethyl-2-bromopropionate<br>$CH_3CHBr\overset{O}{\underset{\|}{C}}-O-CH_2CH_3$ | 50-100 | 25-50 |
| X | Ethyl-2-bromo-n-butyrate<br>$CH_3CH_2CHBr-\overset{O}{\underset{\|}{C}}-O-CH_2CH_3$ | 200-500 | 100-200 |
| XI | Ethyl-3-bromohexanoate<br>$CH_3CH_2CH_2CHBrCH_2\overset{O}{\underset{\|}{C}}-O-CH_2CH_3$ | 500-1,000 | 100-200 |
| XII | Methyl 2,3-dibromo-2-methylpropionate<br>$CH_2Br\overset{CH_3}{\underset{Br}{C}}-\overset{O}{\underset{\|}{C}}-O-CH_3$ | 10-25 | 10-25 |
| XIII | O-chlorophenyl phenyl chloroacetate<br>(phenyl)-CHCl-C(=O)-O-(o-chlorophenyl) | 100-200 | 10-25 |
| XIV | Diethyl bromomalonate<br>$(\underset{Br}{\overset{H}{\underset{\|}{C}}}-\overset{O}{\underset{\|}{C}}-O-CH_2CH_3)_2$ | 200 | 5-10 |
| XV | Diethyl 1,2-dibromo succinate<br>$CH_3CH_2-O-\overset{O}{\underset{\|}{C}}BrCH-CHBr\overset{O}{\underset{\|}{C}}-OCH_2CH_3$ | 100 | 5-10 |
| XVI | Methyl-3-bromo-propionate<br>$BrCH_2CH_2\overset{O}{\underset{\|}{C}}-OCH_3$ | >100 | >100 |
| XVII | Ethyl-3-bromo propionate<br>$BrCH_2CH_2\overset{O}{\underset{\|}{C}}-OCH_2CH_3$ | >100 | >100 |
| XVIII | Methyl-3 bromo n-butyrate<br>$CH_3CH_2CHBr\overset{O}{\underset{\|}{C}}-O-CH_3$ | >100 | >100 |

Aa+ = Aerobacter aerogenes. An++ = Aspergillus niger.
[1] P.p.m. = parts of test chemical per one million microorganisms.

A close examination of Table V shows that those compounds with halogens both alpha (2) and beta (3) to the ester group are clearly superior to any other halogenated esters. These compositions, namely, compositions III, VIII, XII and VII, have an essential skeleton structure as follows:

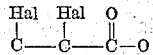

Several points must be noted with regard to Table V. First, while the compositions of the invention broadly comprise polyhalo type esters it is desirable that the halogen atoms be adjacent to each other rather than occur on the same carbon atom as in Compositions V and VI. Also it is to be noted that when the portion of the ester molecule formed from an alcoholic moiety is halogenated, for example, in Compositions II and IV the activity is considerably lower than in the case where the acid part of the molecule has been at least dihalogenated, such as is contemplated in the compositions of the invention. Again, when the carbon content of the alcoholic portion of the halogenated ester becomes too high such as in Composition I, where the alcoholic portion of the ester contain 12 carbon atoms, considerable decrease in activity is noted. As has been described above, it is preferred that the alcoholic portion of the ester contain from 1 to 6 carbon atoms.

Compositions IX, X, XI, and XVI–XVIII each only contain one halogen and show considerably less activity than the analogous compounds of the invention which have, as an essential part of their structure, adjacent halogens on separate carbon atoms.

In addition to the 48 hour inhibition test for *Aerobacter aerogenes* and 5 day inhibition test of *Aspergillus niger*, which results are tabulated in Table V, microbiological activity of methyl 2,3,-dibromopropionate was also determined and compared with certain monohalogenated alkyl esters with regard to 1 and 24 hour killing ranges. As indicated in the above test method an appropriate amount of 18 to 24 hour neutrient broth culture of *A. aerogenes* or spore suspension of *A. niger* was mixed with 200 milliliters of culture medium so as to give an inoculated culture medium having 1 million organisms per milliliter of culture medium. This inoculated culture medium was then added to tubes containing appropriate amounts of test chemicals, the total final volume of test chemical and culture medium being 20 milliliters in each tube. The maximum amount of test chemical introduced was 0.5 milliliter per tube to avoid test chemical-solvent interference. The inoculated media and test chemical were then mixed gently i.e., tubes were shaken in the *A. niger* fungal growth inhibition study, and inverted in the *A. aerogenes* inhibition study to fill the gas detection vials. At the end of 1 and 24 hours contact with the test chemicals, portions of the liquid in the test were diluted 1000 fold to stop the chemical action. The diluted samples were then cultured into sterile culture tubes, incubated for 48–72 hours at 30° C. and examined for growth. Results of these tests then indicate the 1 and 24 hour killing ranges.

Table VI below indicates the microbiological activity of methyl, 2,3-dibromopropionate compared to other halo esters with regard to their 1 hour and 24 hour killing effects. Results are reported as parts of chemical treating agent necessary to effectively inhibit one million microorganisms.

TABLE VI.—MICROBIOLOGICAL KILLING ACTIVITY

| Composition | 1 Hour Kill | | 24 Hour Kill | |
|---|---|---|---|---|
| | A. aerogenes | A. niger | A. aerogenes | A. niger |
| VII | >100 | >100 | 25–50 | 25–50 |
| XVI | >100 | >100 | >100 | >100 |
| XVII | >100 | >100 | >100 | >100 |
| XVIII | >100 | >100 | >100 | >100 |

Table VI above shows that Composition VII, methyl 2,3-dibromopropionate, has relatively quick killing activity, that is, after 24 hours good bacterial and fungal activity is noted. On the other hand, Compositions XVI–XVIII, all containing only one bromo group show little killing effect even after a 24 hour contact period. The above results are particularly meaningful when the chemical is to be applied to an industrial process water system which generally requires rapid microbiological control. If such control is not quickly established, serious problems as earlier described may arise in such systems as papermaking processes and cooling towers.

While it is not fully understood why polyhalogenated and particularly dihalogenated alkyl ester compounds are clearly superior to monohalogenated alkyl esters, it is believed the following theory accounts for the superior microbiological activity.

The slime-forming microorganisms present in industrial process waters have a metabolism involving a citric acid cycle. This cycle involves the ingestion and subsequent use of 2-carbon fragments of organic composition. These fragments are produced by the Acetyl Coenzyme A produced by the microorganisms which later combines with this same enzyme. The enzymatic molecule condenses in turn to form citric acid. Citric acid is then transformed in the cycle itself to useful metabolic nutrients and by-products. Since the particular slimicides would therefore be utilized in 2-carbon segments with the ester group generally being the dividing line of the microbiological attack, there is a high probability that one of the two-carbon segments will include both halogen atoms in the segment. These atoms in turn will be introduced into the system of the microorganism with subsequent destructive or inhibitive results.

The ineffectiveness of the monohalogenated esters is believed to be due to the ability of the particular microorganisms involved in industrial process waters to detoxify by various known mechanisms the two-carbon segments containing only a monohalogen constituent.

Besides laboratory evaluation of the compositions of the invention, a long-term paper plant field test was made. Test chemical was prepared and evaluated in a closed white water papermill system using a Fourdrinier machine which produced 60 tons of paper per day during normal operation. Discussion of the run and results is made in Example II below.

*Example II*

The particular microbiocidal chemical employed in this plant run was methyl 2,3-dibromopropionate. During the course of the run the dosage of a 30% active formulation varied from 0.3–1.5 pounds per ton of paper pulp.

Prior use of a competitive organo-sulfur product failed to control the mocroorganism activity to any appreciable extent. With use of the competitive chemical, microorganism problems such as stringers and surface slime build-ups on the tray areas, table roll deflectors, headbox baffle, wire pit baffles and walls, inside suction boxes and also on the Sveen Saveall walls and stand-pipes were noted as problems. The white water pit receiving the Sveen effluent was a particularly troublesome area to control with regard to slime build-up.

Tables VII, VIII, IX and X show micro analyses of samples taken at various paper process locations after a certain number of hours of plant run with methyl 2,3-dibromopropionate. The samples of stock were taken from the process stream at the points indicated. Also, included in each of these tables is a micro analysis of a sample taken at that specific area prior to the beginning dosage with the halogenated ester. Throughout the trial daily inspections were made of surface build-ups on the tray areas and in the Saveall stand-pipes to note for slime. It was noted that the stock lines, and chest and white water system were essentially free of any slime build-ups as were the tray areas and the Saveall stand-pipes. The microorganism counts during the whole of the trial showed excellent control patterns, with only moderate microbiological involvement in surface or subsurface build-ups. At no time was there any evidence of operational difficulties or problems as had occurred with prior use of various chemicals.

Samples of stock were taken at the Beater Chest Stock (Table VII), Tray White Water (Table VIII), Sveen Effluent (Table IX) and Machine Chest Stock at Regulator Box (Table X), at various times during the course of the run. Tables VII–X list the colonies of bacteria or fungi as colonies per ml. of sample.

TABLE VII.—SAMPLE TAKEN AT BEATER CHEST STOCK

| Hours of Run | Microbiological Analyses | | |
|---|---|---|---|
| | Flavobacterium (non-spore bacteria) | Spore-forming Bacteria | Fungi Types |
| Before Treatment | 18,000,000 | 500 | 3,000 |
| 24 | 2,000,000 | 100 | 1,000 |
| 96 | 500,000 | 100 | 500 |

TABLE VIII.—SAMPLE TAKEN AT TRAY WHITE WATER

| Hours of Run | Microbiological Analyses | | |
|---|---|---|---|
| | Flavobacterium (non-spore bacteria) | Spore-forming Bacteria | Fungi Types |
| Before Treatment | 11,000,000 | 500 | 200 |
| 24 | 4,000 | 0 | 0 |
| 48 | 6,000 | 200 | 50 |
| 72 | 800,000 | 0 | 100 |
| 96 | 500,000 | 0 | 100 |

TABLE IX.—SAMPLE TAKEN AT SVEEN EFFLUENT

| Hours of Run | Microbiological Analyses | | |
|---|---|---|---|
| | Flavobacterium (non-spore bacteria) | Spore-forming Bacteria | Fungi Types |
| Before Treatment | 32,000,000 | 0 | 600 |
| 24 | 200,000 | 150 | 5 |
| 48 | 120,000 | 100 | 0 |
| 72 | 60,000 | 200 | 0 |
| 96 | 9,000 | 0 | |

TABLE X.—SAMPLE TAKEN AT MACHINE CHEST STOCK AT REGULATOR BOX

| Hours of Run | Microbiological Analyses | | |
|---|---|---|---|
| | Flavobacterium (non-spore bacteria) | Spore-forming Bacteria | Fungi Types |
| Before Treatment | 23,000,000 | 500 | 1,000 |
| 24 | 800,000 | 0 | 3,000 |
| 48 | 300,000 | 0 | 30 |
| 72 | 4,000 | 0 | 50 |
| 96 | 60,000 | 0 | 150 |

The above tables show excellent microbiological control through the use of methyl 2,3-dibromopropionate. The same type of test was run for three succesive weeks after weekly clean-ups and showed equally excellent results. It must be noted that the biostatic polyhalogenated treating agent inhibited both bacterial and fungal types of microorganisms. This is an extremely important factor in treatment of industrial process water systems.

What is claimed is:

1. The method of inhibition of growth and reproduction of microbiological organisms in industrial process water systems which comprises the steps of treating said system with at least a microbiocidal amount of a composition which comprises an organic polyhalogenated ester corresponding to the type-formula:

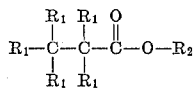

where $R_1$ is selected from the group consisting of lower alkyl, halogen and hydrogen, and $R_2$ is a hydrocarbon radical containing from 1 to 6 carbons with the proviso that at least two occurrences of $R_1$ are halogen.

2. The method of claim 1 where $R_2$ contains from 1 to 3 carbons.

3. The method of claim 1 where $R_2$ contains from 1 to 3 carbons and the halogen is bromine.

4. The method of claim 1 where the alkyl halogenated ester is methyl 2,3-dibromopropionate.

5. The method of inhibition of growth and reproduction of microbiological organisms in paper making process water systems which comprises the steps of treating said system with at least a microbiocidal amount of a composition which comprises an alkyl polyhalogenated ester corresponding to the type-formula:

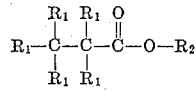

where $R_1$ is selected from the group consisting of methyl, halogen and hydrogen, and $R_2$ is a hydrocarbon radical containing from 1 to 6 carbons with the proviso that at least two occurrences of $R_1$ are halogen.

6. The method of claim 5 where the alkyl polyhalogenated ester is methyl 2,3-dibromopropionate.

7. The method of claim 5 where the alkyl polyhalogenated ester is methyl 2,3-dibromopropionate.

8. A slime-controlled industrial paper mill white water system which contains therein an aqueous suspension of 0.1–15% by weight of cellulosic fibers based on the weight of the system and at least a microbiocidal amount of slime control composition comprising an alkyl polyhalogenated ester corresponding to the type-formula:

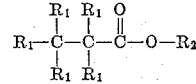

where $R_1$ is selected from the group consisting of methyl, halogen and hydrogen, and $R_2$ is a hydrocarbon radical containing from 1 to 6 carbons with the proviso that at least two occurrences of $R_1$ are halogen.

9. The system of claim 8 where the slime control composition is methyl, 2,3,-dibromopropionate.

References Cited in the file of this patent

UNITED STATES PATENTS

| | | |
|---|---|---|
| 2,419,021 | Harnden | Apr. 15, 1947 |
| 2,976,236 | Bennett et al. | Mar. 21, 1961 |
| 3,008,869 | Hopkins et al. | Nov. 14, 1961 |
| 3,017,319 | Rader | Jan. 16, 1962 |

UNITED STATES PATENT OFFICE
CERTIFICATE OF CORRECTION

Patent No. 3,151,020                      September 29, 1964
George A. Cruickshank, deceased, by
Agnes M. Cruickshank, administratrix It is hereby certified that error appears in the above numbered patent requiring correction and that the said Letters Patent should read as corrected below.

Column 5, line 5, for "2 propionate" read -- 2 methyl propionate --; column 12, line 48, for "mocroorganism" read -- microorganism --.

Signed and sealed this 2nd day of February 1965.

(SEAL)
Attest:

ERNEST W. SWIDER                      EDWARD J. BRENNER
Attesting Officer                        Commissioner of Patents